(No Model.)

J. F. WHITTAKER, E. P. WHITAKER & W. C. WHITMAN.
GAS AND AIR VALVE.

No. 496,805. Patented May 2, 1893.

Witnesses:
J. A. Southworth
L. L. Miller

Inventors:
Joseph F. Whittaker,
Emil P. Whitaker,
Walter C. Whitman.
By A. O. Behel
Atty.

UNITED STATES PATENT OFFICE.

JOSEPH F. WHITTAKER, EMIL P. WHITAKER, AND WALTER C. WHITMAN, OF ROCKFORD, ILLINOIS.

GAS AND AIR VALVE.

SPECIFICATION forming part of Letters Patent No. 496,805, dated May 2, 1893.

Application filed June 25, 1892. Serial No. 438,031. (No model.)

*To all whom it may concern:*

Be it known that we, JOSEPH F. WHITTAKER, EMIL P. WHITAKER, and WALTER C. WHITMAN, citizens of the United States, residing at Rockford, county of Winnebago and State of Illinois, now of Cleveland, county of Cuyahoga, and State of Ohio, have invented certain new and useful Improvements in Gas and Air Mixers, of which the following is a specification.

The object of this invention is to construct a combined gas and air mixer employed in gas stoves and one in which the air supply can be completely cut off or the amount of air regulated according to the pressure of gas employed.

The further object of this invention is to provide the mixing chamber in two sections in order that the internal parts of the valve may be accessible for repairs and cleaning.

Figure 1:
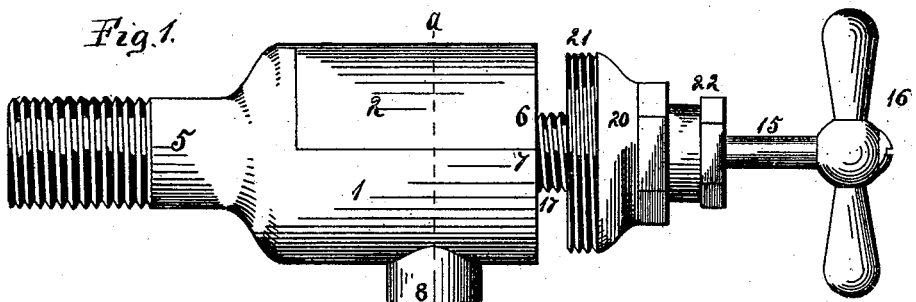
Figure 2:
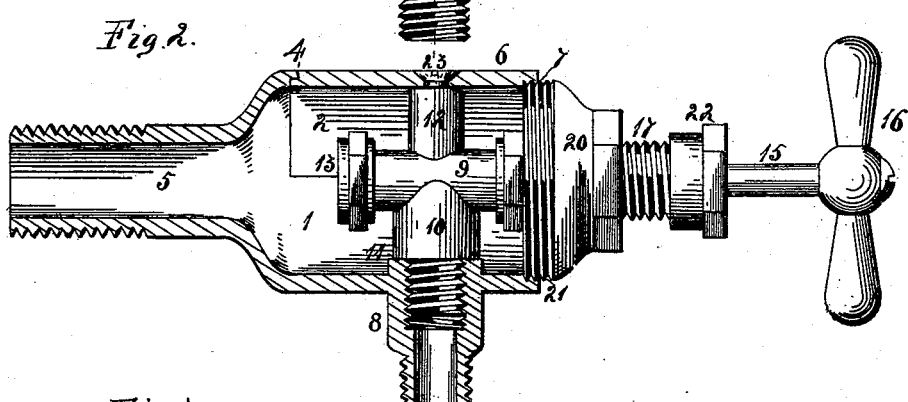
Figure 3:
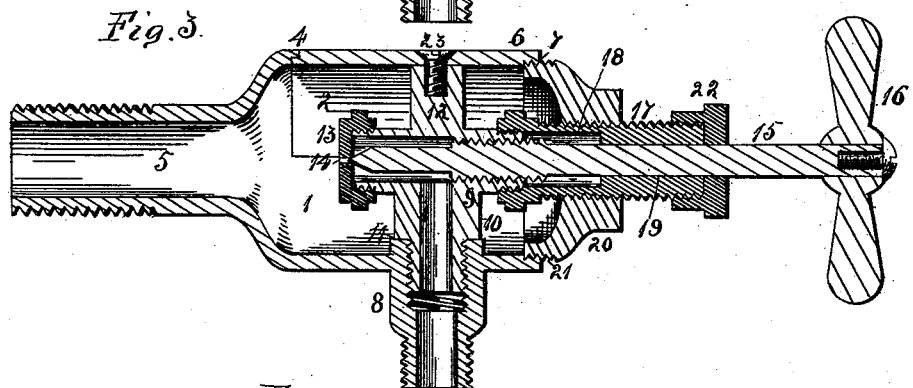
Figure 4:
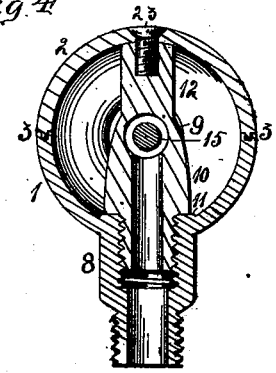

In the accompanying drawings, Figure 1, is a side elevation of our improved gas and air valve. Fig. 2, is a vertical central section through the casing of the mixing chambers. Fig. 3, is also a vertical central section through the valve. Fig. 4, is a transverse vertical section on dotted line *a* Fig. 1.

The mixing chamber of our improved valve is of cylindrical form and composed of a main portion 1, and a cap 2, said parts having a tongue and groove connection as shown at 3 and a lap joint at its end as shown at 4. The end 5, has an external screw thread by which a connection is formed with the burner. The larger end 6, is provided with an internal screw thread 7. From the inner side of the main portion depends an external screw threaded nipple 8, through which the gas is admitted to the mixing chamber.

Within the mixing chamber we locate the seat and support for needle valve, which is held in position in a removable manner and consists of a horizontal portion having its outer end internally screw threaded, and both ends externally screw threaded, a vertical tubular portion 10, having its lower end externally screw threaded has a screw threaded engagement with the main portion of the mixing chamber, and the shoulder 11, will bring it at rest in the proper position. From the upper surface of the horizontal portion rises a stud 12, having a screw threaded socket. A cap 13, having an opening 14, has an internal screw thread and is placed in position on the inner end of the horizontal portion 9 and forms the seat for the gas valve. The gas valve 15, is of the usual needle form having a portion of its length externally screw threaded which engages the internal screw thread of the outer end of the horizontal portion 9 and a removable handle 16 is secured to the outer end of the valve stem. An extension to the horizontal portion 9, consists of an externally screw threaded shank 17, having its inner end internally screw threaded which engages the external screw threads of the outer end of the horizontal portion. The central longitudinal opening of this extension is of two diameters, the larger diameter 18, to allow the screw threaded portion of the needle valve to be withdrawn, and the smaller diameter 19 acts as a guide for the valve stem. Upon the external screw thread of this extension is located an air valve 20, which is capable of adjustment in the lengthwise direction of the extension. The inner end 21, of the air valve is externally screw threaded and is of such diameter to enter the open end of the mixing chamber. A screw threaded cap 22, is placed over the outer end of the extension which prevents the displacement of the air valve and also serves to prevent the escape of gas along the valve stem.

In placing the parts of our valve together the seat and support for the needle valve is first turned down until its shoulder 11 firmly engages its seat which will bring the central horizontal opening in the lengthwise center of the mixing chamber. The cap or valve seat is now placed in position over the inner end of the horizontal portion 9. The cap or cover 2, is firmly clamped in position by the screw 23 entering the screw threaded socket of the stud 12. The handle 16 is removed from the valve stem and the valve turned into position in the horizontal portion 9. The extension 17 is turned into engagement with the horizontal portion. The air valve is now turned into position of the extension, the cap 22 is turned onto the end of the extension and the handle 16, is secured to the valve stem.

In using the valve when coal or natural gas is employed, the air valve will be in the position shown at Fig. 1, that is, air is necessary for the proper combustion of the gas and the quantity of air can be regulated by turning the air valve nearer to or farther from the open end of the mixing chamber, and the quantity of gas can be regulated by the needle valve, the air and gas uniting in front of the cap forming the seat for the needle valve, and passes through the smaller end of the mixing chamber to the burner.

In the employment of fuel-gas, air is unnecessary to its proper combustion. We therefore turn the air valve upon the extension until its external screw thread 21 will engage the internal screw thread 7, of the larger end 6 of the mixing chamber and continuing the turning will entirely exclude the admission of air to the mixing chamber.

The cap 13, extension 17, air valve 20 and cap 22 each have a portion of their exterior surface sided in order that if necessary a wrench may be employed to turn them into position or remove them.

By the above combination of gas and air valves we can readily remove all the parts for the purpose of repairs or cleaning, and it will be noticed that the length of the horizontal portion 9 when the cap 13 and extension 17 are removed will be less than the inside diameter of the mixing chamber, in order that it may be screwed into position or removed therefrom, and by making the valve seat in the cap 13 it can be removed from the horizontal portion, a new one substituted, or the size of the opening 14, can be made to correspond to the pressure of gas employed.

We claim as our invention—

1. In a gas and air mixer, a mixing chamber, a gas inlet to the chamber having an externally screw-threaded extension and an internally screw-threaded socket, a valve, a valve support having a screw-threaded extension which enters the socket, a section of the chamber made removable and having a connection with the valve support, a screw-threaded extension for the valve support and an air valve having a screw-threaded connection with the extension.

2. In a gas and air mixer, a mixing chamber, a gas inlet to the chamber having an externally screw-threaded extension and an internally screw threaded socket, a valve, a valve support having a screw-threaded extension which enters the socket, a section of the chamber made removable and having a connection with the valve support, a screw-threaded extension for the valve support and an air valve having a screw-threaded connection with the extension and a screw-threaded connection with the mixing chamber.

JOSEPH F. WHITTAKER.
EMIL P. WHITAKER.
WALTER C. WHITMAN.

Witnesses:
A. O. BEHEL,
L. L. MILLER.